United States Patent
Lutas

(10) Patent No.: US 9,703,726 B2
(45) Date of Patent: Jul. 11, 2017

(54) SYSTEMS AND METHODS FOR DYNAMICALLY PROTECTING A STACK FROM BELOW THE OPERATING SYSTEM

(71) Applicant: Bitdefender IPR Management Ltd., Nicosia (CY)

(72) Inventor: Andrei V. Lutas, Satu Mare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 62 days.

(21) Appl. No.: 14/312,712

(22) Filed: Jun. 24, 2014

(65) Prior Publication Data

US 2015/0370724 A1 Dec. 24, 2015

(51) Int. Cl.
| | |
|---|---|
| *G06F 12/00* | (2006.01) |
| *G06F 12/14* | (2006.01) |
| *G06F 12/1009* | (2016.01) |
| *G06F 21/53* | (2013.01) |
| *G06F 21/55* | (2013.01) |

(52) U.S. Cl.
CPC ........ *G06F 12/145* (2013.01); *G06F 12/1009* (2013.01); *G06F 12/1483* (2013.01); *G06F 21/53* (2013.01); *G06F 21/554* (2013.01); *G06F 2212/1052* (2013.01); *G06F 2212/65* (2013.01)

(58) Field of Classification Search
CPC ............... G06F 12/145; G06F 12/1009; G06F 12/1483; G06F 2212/1052; G06F 2212/65; G06F 21/56; G06F 21/566
See application file for complete search history.

(56) References Cited

U.S. PATENT DOCUMENTS

| | | |
|---|---|---|
| 7,581,089 B1 | 8/2009 | White |
| 7,797,747 B1 * | 9/2010 | Ferrie .................. G06F 21/562 726/22 |
| 8,214,900 B1 | 7/2012 | Satish et al. |
| 8,341,627 B2 | 12/2012 | Mohinder |
| 8,434,073 B1 | 4/2013 | Satish et al. |

(Continued)

FOREIGN PATENT DOCUMENTS

GB 2433621 A 6/2007

OTHER PUBLICATIONS

Cowan et al., "StackGuard: Automatic Adaptive Detection and Prevention of Buffer-Overflow Attacks," Proceedings of the 7th USENIX Security Symposium, San Antonio, Texas, Jan. 26-29, 1998.

(Continued)

*Primary Examiner* — Charles Rones
*Assistant Examiner* — Nanci Wong
(74) *Attorney, Agent, or Firm* — Law Office of Andrei D Popovici, PC

(57) ABSTRACT

Described systems and methods allow protecting a host system against malware, using hardware virtualization technology. A memory introspection engine executes at the level of a hypervisor, protecting a virtual machine (VM) from exploits targeting the call stack of a thread executing within the respective VM. The introspection engine identifies a virtual memory page reserved for the stack, but not committed to the stack, and intercepts an attempt to write to the respective page. In response to intercepting the write attempt, the memory introspection engine marks the respective page as non-executable, thus protecting the stack against exploits.

23 Claims, 5 Drawing Sheets

(56) References Cited

U.S. PATENT DOCUMENTS

| | | | |
|---|---|---|---|
| 8,515,075 B1 | 8/2013 | Saraf et al. | |
| 8,621,337 B1 | 12/2013 | Jacob et al. | |
| 2005/0198464 A1* | 9/2005 | Sokolov | G06F 12/10 711/203 |
| 2006/0143350 A1* | 6/2006 | Miloushev | G06F 9/5016 710/242 |
| 2008/0235757 A1 | 9/2008 | Li | |
| 2010/0332788 A1* | 12/2010 | Zhao | G06F 12/1027 711/207 |
| 2011/0047543 A1 | 2/2011 | Mohinder | |
| 2012/0254995 A1 | 10/2012 | Sallam | |
| 2012/0255031 A1 | 10/2012 | Sallam | |
| 2012/0291126 A1 | 11/2012 | Lagar-Cavilla | |
| 2013/0086299 A1* | 4/2013 | Epstein | G06F 12/1475 711/6 |
| 2013/0227680 A1 | 8/2013 | Pavlyushchik | |
| 2014/0068137 A1* | 3/2014 | Kegel | G06F 12/1009 711/6 |
| 2014/0143497 A1* | 5/2014 | Olson | G06F 12/0802 711/132 |
| 2014/0189882 A1* | 7/2014 | Jung | G06F 9/45558 726/27 |
| 2016/0026581 A1* | 1/2016 | Muttik | G06F 12/1441 726/26 |

OTHER PUBLICATIONS

Ven, Arjan van de, "New Security Enhancements in Red Hat Enterprise Linux v.3, update 3," Red Hat Inc., Raleigh, North Carolina, Aug. 2004.

ISEC Security Research, "kNox—implementation of non-executable page protection mechanism," http://isec.pl/projects/knox/knox.html, iSEC Security Research, Poland, downloaded on Apr. 4, 2014.

European Patent Office (ISA), International Search Report and Written Opinion for International Application No. PCT/RO2015/050005, international filing date Jun. 23, 2015.

* cited by examiner

SYSTEMS AND METHODS FOR DYNAMICALLY PROTECTING A STACK FROM BELOW THE OPERATING SYSTEM

BACKGROUND

The invention relates to systems and methods for protecting computer systems from malware.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others.

A particular class of malware attack targets a call stack of a running process, for instance by exploiting a buffer overflow vulnerability to inject malicious code into a memory page allocated to the stack, and then executing the respective code.

Hardware virtualization technology allows the creation of simulated computer environments commonly known as virtual machines, which behave in many ways as physical computer systems. In typical modern applications, such as server consolidation and infrastructure-as-a-service (IAAS), several virtual machines may run simultaneously on the same physical machine, sharing the hardware resources among them, thus reducing investment and operating costs. Each virtual machine may run its own operating system and/or software applications, separately from other virtual machines.

Due to the steady proliferation of malware, each such virtual machine potentially requires malware protection, including protection against exploits that use the stack for malicious purposes. There is considerable interest in developing efficient, robust, and scalable anti-malware solutions for hardware virtualization platforms.

SUMMARY

According to one aspect, a host system comprises a hardware processor configured to operate a virtual machine and a memory introspection engine executing outside the virtual machine. The virtual machine comprises a virtualized processor and a virtualized memory, and is configured to employ the virtualized processor to execute a target thread of a process. The memory introspection engine is configured to identify within a virtual memory space of the process a target page reserved for a call stack of the target thread, and to determine according to a page table of the virtual machine whether the target page is mapped to the virtualized memory. The memory introspection engine is further configured, in response to determining whether the target page is mapped to the virtualized memory, when the target page is not mapped to the virtualized memory, to intercept an attempt to write to the target page, and in response to intercepting the attempt to write to the target page, to prevent the virtualized processor from executing a content of the target page.

According to another aspect, a method comprises employing at least one hardware processor of a host system to execute a memory introspection engine, the memory introspection engine executing outside of a virtual machine exposed by the host system, the virtual machine comprising a virtualized processor and a virtualized memory, the virtual machine configured to employ the virtualized processor to execute a target thread of a process. Executing the memory introspection engine comprises identifying within a virtual memory space of the process a target page reserved for a call stack of the target thread, and determining according to a page table of the virtual machine whether the target page is mapped to the virtualized memory. Executing the memory introspection engine further comprises, in response to determining whether the target page is mapped to the virtualized memory, when the target page is not mapped to the virtualized memory, intercepting an attempt to write to the target page, and in response to intercepting the attempt to write to the target page, preventing the virtualized processor from executing a content of the target page.

According to another aspect, a non-transitory computer-readable medium stores instructions which, when executed by at least one hardware processor of a host system, cause the host system to form a memory introspection engine executing outside of a virtual machine exposed by the host system, the virtual machine comprising a virtualized processor and a virtualized memory, the virtual machine configured to employ the virtualized processor to execute a target thread of a process, and wherein the memory introspection engine is configured to identify within a virtual memory space of the process a target page reserved for a call stack of the target thread, and to determine according to a page table of the virtual machine whether the target page is mapped to the virtualized memory. The memory introspection engine is further configured, in response to determining whether the target page is mapped to the virtualized memory, when the target page is not mapped to the virtualized memory, to intercept an attempt to write to the target page, and in response to intercepting the attempt to write to the target page, to prevent the virtualized processor from executing a content of the target page.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself Unless otherwise specified, a process is an instance of a computer program, such as an application or a part of an operating system, and is characterized by having at least an execution thread and a virtual memory space assigned to it by the operating system, wherein a content of the respective virtual memory space includes executable code. Unless otherwise specified, a page represents the smallest unit of virtual memory that can be individually mapped to a physical memory of a host system. A reserved stack page is a page located within a virtual memory space of a process, the respective page reserved for a call stack of a thread of the respective process. A committed stack page is a reserved stack page mapped to a physical memory of a host system. An uncommitted stack page is a reserved stack page not mapped to the physical memory. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
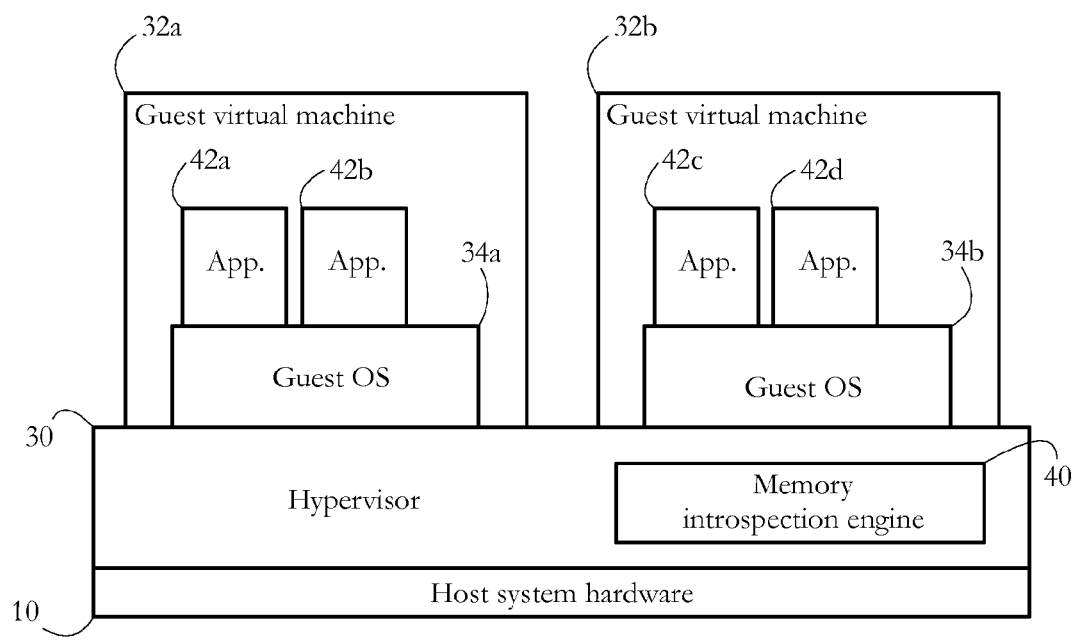
FIG. 1 shows an exemplary set of virtual machines exposed by a hypervisor executing on a host system, and a memory introspection engine protecting the set of virtual machines from malware according to some embodiments of the present invention.

FIG. 1 shows an exemplary configuration of a host system 10 running a hardware virtualization platform and protected from malware according to some embodiments of the present invention. Host system 10 may represent a corporate computing device such as an enterprise server, or an end-user device such as a personal computer, tablet computer, or smartphone. Other exemplary host systems include entertainment devices such as TVs and game consoles, or any other device having a memory and a processor, and requiring malware protection. In the example of FIG. 1, host system 10 executes a set of guest virtual machines 32a-b, exposed by a hypervisor 30. A virtual machine (VM) comprises an abstraction, e.g., a software emulation, of an actual physical machine/computer system, the VM capable of running an operating system and other applications. Hypervisor 30 includes software configured to create a plurality of virtualized devices, such as a virtual processor and a virtual memory controller, and to present such virtualized devices to software in place of the real, physical devices of host system 10. Such operations of hypervisor 30 are commonly known in the art as exposing a virtual machine. In some embodiments, hypervisor 30 allows a multiplexing (sharing) by multiple virtual machines of hardware resources of host system 10. Hypervisor 30 may further manage such multiplexing so that each VM operates independently and is unaware of other VMs executing concurrently executing on host system 10. Examples of popular hypervisors include the VMware vSphere™ from VMware Inc. and the open-source Xen hypervisor, among others.

Each VM 32a-b may execute a guest operating system (OS) 34a-b, respectively. A set of exemplary applications 42a-d generically represent any software application, such as word processing, image processing, media player, database, calendar, personal contact management, browser, gaming, voice communication, data communication, and anti-malware applications, among others. Operating systems 34a-b may comprise any widely available operating system such as Microsoft Windows®, MacOS®, Linux®, iOS®, or Android™, among others. Each OS provides an interface between applications executing within a virtual machine and the virtualized hardware devices of the respective VM. In the following description, software executing on a virtual processor of a virtual machine is said to execute within the respective virtual machine. For instance, in the example of FIG. 1, applications 42a-b are said to execute within guest VM 32a, while applications 42c-d are said to execute within guest VM 32b. In contrast, hypervisor 30 is said to execute outside, or below, guest VMs 32a-b.

In some embodiments, hypervisor 30 includes a memory introspection engine 40, configured to perform anti-malware operations as described further below. Engine 40 may be incorporated into hypervisor 30, or may be delivered as a software component distinct and independent from hypervisor 30, but executing at substantially similar processor privilege level as hypervisor 30. A single engine 40 may be configured to malware-protect multiple VMs executing on host system 10.

Figure 2:
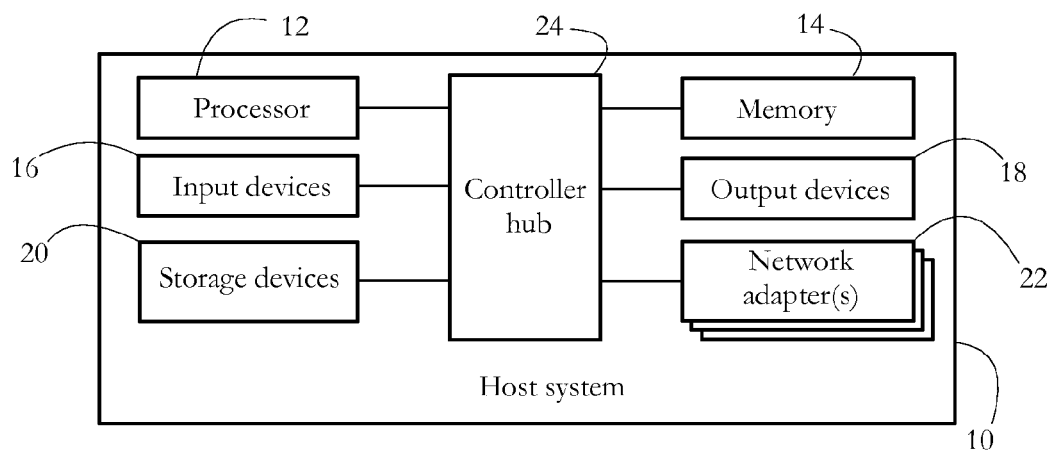
FIG. 2 shows an exemplary hardware configuration of the host system according to some embodiments of the present invention.

FIG. 2 shows an exemplary hardware configuration of host system 10. System 10 comprises a set of physical devices, including a processor 12, a memory unit 14, a set of input devices 16, a set of output devices 18, a set of storage devices 20, and a set of network adapters 22, all connected by a controller hub 24. In some embodiments, processor 12 comprises a physical device (e.g. multi-core integrated circuit formed on a semiconductor substrate) configured to execute computational and/or logical operations with a set of signals and/or data. In some embodiments, such logical operations are delivered to processor 12 in the form of a sequence of processor instructions (e.g. machine code or other type of software). Memory unit 14 may comprise volatile computer-readable media (e.g. RAM) storing data/signals accessed or generated by processor 12 in the course of carrying out instructions.

Input devices 16 may include computer keyboards, mice, and microphones, among others, including the respective hardware interfaces and/or adapters allowing a user to introduce data and/or instructions into host system 10. Output devices 18 may include display devices such as monitors and speakers, among others, as well as hardware interfaces/adapters such as graphic cards, allowing host system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may include a memory controller, an input/output (I/O) controller, and an interrupt controller, among others. In another example, controller hub 24 may comprise a northbridge connecting processor 12 to memory 14 and/or a southbridge connecting processor 12 to devices 16, 18, 20, and 22.

Figure 3:
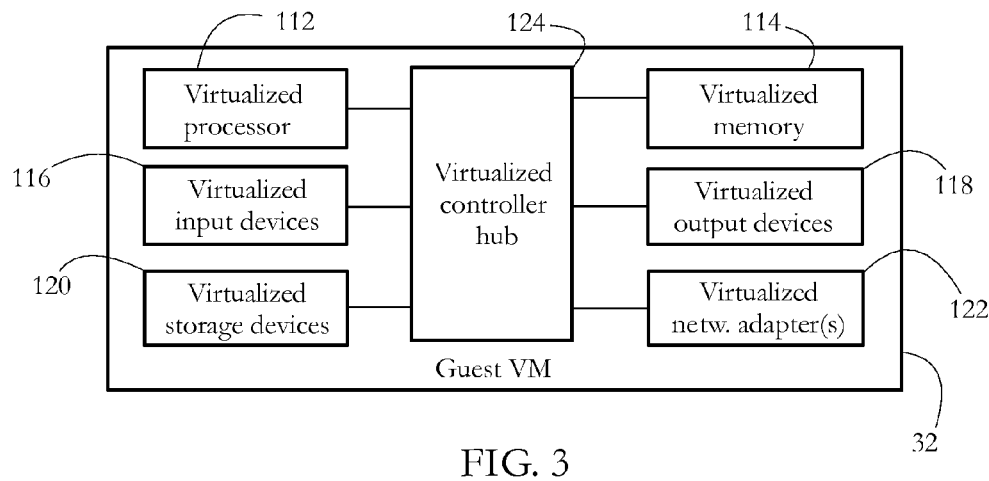
FIG. 3 shows an exemplary configuration of virtualized hardware exposed to a guest virtual machine according to some embodiments of the present invention.

FIG. 3 shows an exemplary configuration of a virtual machine 32, as exposed by hypervisor 30. VM 32 may represent any of VMs 32a-b of FIG. 1. VM 32 includes a virtualized processor 112, a virtualized memory unit 114, virtualized input devices 116, virtualized output devices 118, virtualized storage 120, virtualized network adapters 122, and a virtualized controller hub 124. Virtualized processor 112 comprises an emulation of at least some of the functionality of processor 12, and is configured to receive for execution processor instructions forming part of software such as an operating system and other applications. Software using processor 112 for execution is deemed to execute within virtual machine 32. In some embodiments, virtualized memory unit 114 comprises addressable spaces for storing and retrieving data used by virtualized processor 112. Other virtualized devices (e.g., virtualized input, output, storage, etc.) emulate at least some of the functionality of the respective physical devices of host system 10. Virtualized processor 112 may be configured to interact with such devices as it would with the corresponding physical devices. For instance, software executing within VM 32 may send and/or receive network traffic via virtualized network adapter(s) 122. In some embodiments, hypervisor 30 may expose only a subset of virtualized devices to VM 32 (for instance, only virtualized processor 112, virtualized memory 114, and parts of hub 124). Hypervisor 30 may also give a selected VM exclusive use of some hardware devices of host system 10. In one such example, VM 32a (FIG. 1) may have exclusive use of input devices 16 and output devices 18, but lack a virtualized network adapter. Meanwhile, VM 32b may have exclusive use of network adapter(s) 22. Such configurations may be implemented, for instance, using VT-d® technology from Intel.

Figure 4:
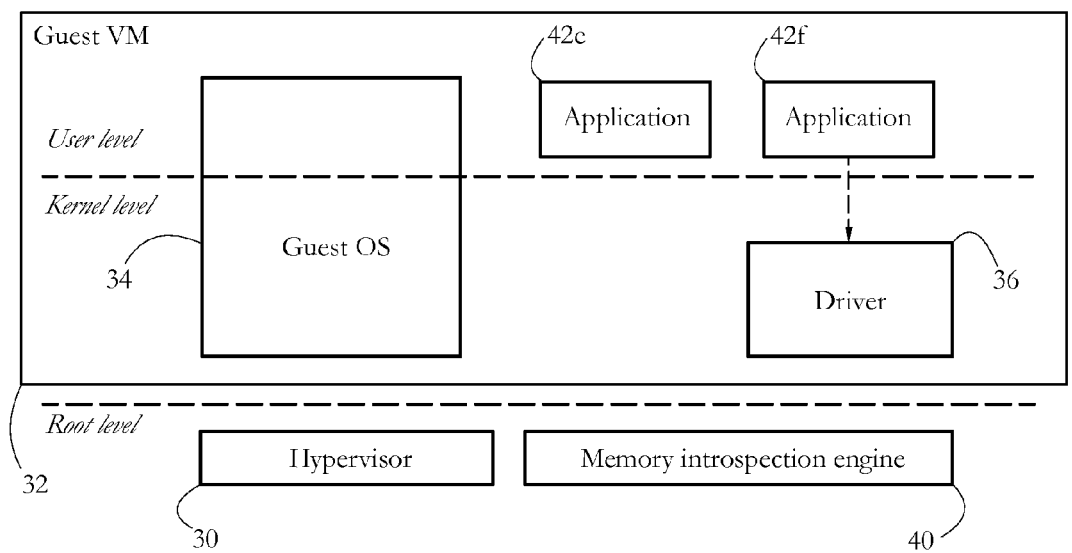
FIG. 4 illustrates an exemplary hierarchy of software objects executing on the host system at various processor privilege levels, according to some embodiments of the present invention.

FIG. 4 illustrates an exemplary hierarchy of software objects executing on host system 10 according to some embodiments of the present invention. FIG. 4 is represented from the perspective of processor privilege levels, also known in the art as layers or protection rings. In some embodiments, hypervisor 30 takes control of processor 12 at the most privileged level (e.g., VMXroot on Intel platforms supporting virtualization, also known as ring −1, or root mode), thus creating a hardware virtualization platform exposed as virtual machine 32 to other software executing on host system 10. An operating system 34, such as guest OSs 34a-b in FIG. 1, executes within the virtual environment of VM 32, OS 34 having lesser processor privilege than hypervisor 30 (e.g., ring 0 or kernel mode). A set of applications 42e-f execute at lesser processor privilege than OS 34 (e.g., ring 3 or user mode). Parts of applications 42e-f may execute at kernel privilege level, for instance a driver 36 installed by application 42f. Some parts of OS 34 may execute in user mode (ring 3).

An exemplary driver 36 performs anti-malware operations such as detecting malware-indicative behavior of software objects and/or identifying malware-indicative signatures within software objects. In some embodiments, driver 36 may collaborate with introspection engine 40. An anti-malware component executing within guest VM 32 may have some advantages. For instance, determining various information about running processes and threads may be substantially easier to do from within guest VM 32, than from the level of engine 40. In one example, driver 36 may determine a memory address of a resource used by a target process or thread, and communicate the address to engine 40. In another example, driver 36 may receive a message from engine 40 and in response, display a malware warning message to a user of guest VM 32. Communication between components executing inside guest VM 32 and engine 40 may be carried out using any method known in the art of virtualization (for instance, via a dedicated section of memory accessible to both engine 40 and driver 36).

In some embodiments, introspection engine 40 executes substantially at the same processor privilege level as hypervisor 30 (e.g., ring −1 or root mode), and is configured to perform introspection of virtual machines executing on host system 10, such as VM 32. Introspection of a VM, or of a software object executing within the respective VM, may comprise analyzing a behavior of the respective software object. For instance, introspection may comprise identifying a set of operations performed by the object (e.g., issuing a system call, accessing a registry of the OS, downloading a file from a remote location, writing data to a file, etc.). Introspection may further comprise determining addresses of memory sections containing parts of the software object, accessing the respective memory sections, and analyzing a content stored within the respective memory sections. Other examples of introspection include intercepting and/or restricting access to such memory sections, e.g., preventing a process from over-writing code or data used by another process, and preventing the execution of code stored in certain memory pages. In some embodiments, objects selected for introspection by engine 40 comprise processes, instruction streams, registers, and data structures such as page tables and driver objects of the respective VM, among others.

To perform introspection of VM 32 in a configuration as illustrated in FIG. 1 (i.e., from outside the respective VM), some embodiments of engine 40 employ memory mapping structures and mechanisms of processor 12. Virtual machines typically operate with a virtualized physical memory (see, e.g., memory 114 in FIG. 3), also known in the art as guest-physical memory. Virtualized physical memory comprises an abstract representation of the actual physical memory 14, for instance as a contiguous space of addresses specific to each guest VM, with parts of said space mapped to addresses within physical memory 14 and/or physical storage devices 20. In systems configured to support virtualization, such mapping is typically achieved via dedicated data structures and mechanisms controlled by processor 12, known as second level address translation (SLAT). Popular SLAT implementations include extended page tables (EPT, on Intel® platforms), and nested page tables (NPT, on AMD® platforms). In such systems, virtualized physical memory may be partitioned in units known in the art as pages, a page representing the smallest unit of virtualized physical memory individually mapped to physical memory via mechanisms such as EPT and/or NPT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the EPT/NPT and therefore the mapping between physical memory and virtualized physical memory. The actual mapping (translation) of a virtualized physical memory address to a physical memory address may comprise looking up the physical memory address in a translation lookaside buffer (TLB) of host system 10. In some embodiments, address translation comprises performing a page walk, which includes a set of successive address look-ups in a set of page tables and/or page directories, and performing calculations such as adding an offset of a page to an address relative to the respective page.

In some embodiments, OS 34 configures a virtual memory space for a process such as applications 42*e-f* in FIG. 4, by maintaining a mapping (address translation) between the respective virtual memory space and the virtualized physical memory of VM 32, for instance using a page table mechanism. In some embodiments, the process virtual memory space is also partitioned into pages, such pages representing the smallest unit of virtual memory individually mapped to virtualized physical memory by OS 34, i.e., virtual to virtualized-physical memory mapping is performed with page granularity.

Figure 5:
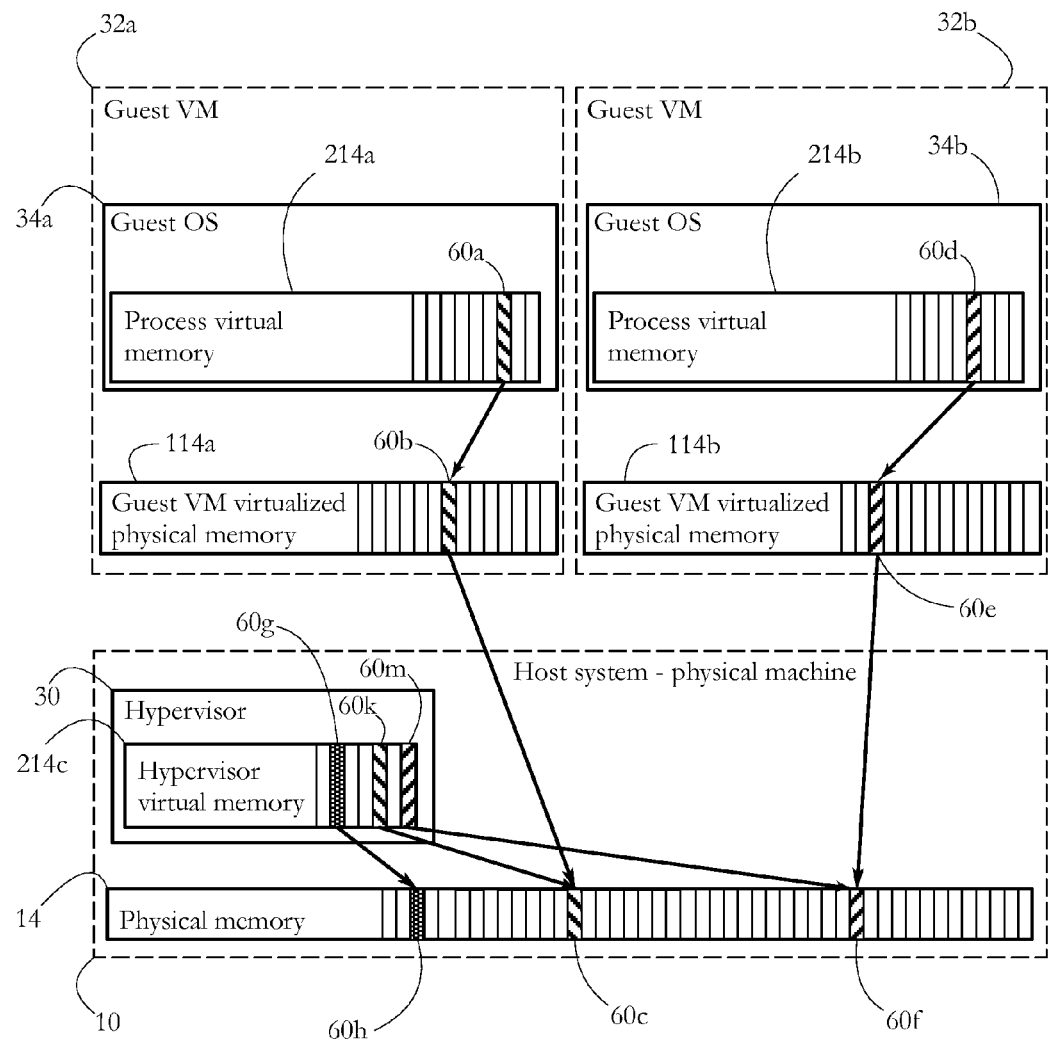
FIG. 5 shows an exemplary mapping of memory addresses in some embodiments of the present invention.

FIG. 5 illustrates an exemplary mapping of memory addresses in an embodiment as shown in FIG. 1. Following exposure by hypervisor 30, each guest VM 32*a-b* sees a virtualized physical memory space 114*a-b*, respectively, as its own physical memory space. A software object (e.g., a process) executing within guest VM 32*a* is assigned a virtual memory space 214*a* by guest OS 34*a*. When the software object attempts to access a content of an exemplary memory page 60*a* of space 214*a*, an address of page 60*a* is translated by the virtualized processor of guest VM 32 into an address of a page 60*b* of virtualized physical memory space 114*a* of VM 32, according to page tables configured and controlled by guest OS 34*a*. The address of page 60*b* is further mapped by physical processor 12 to an address of a page 60*c* within physical memory 14 of host system 10, for instance using SLAT means configured by hypervisor 30.

Meanwhile, guest OS 34*b* sets up a virtual memory space 214*b* for a software object executing within guest VM 32*b*. A page 60*d* within space 214*b* is mapped by the virtualized processor of VM 32*b*, for instance via page tables set up by OS 34*b*, to a page 60*e* of guest-physical space 114*b*. The address of page 60*e* is further translated by physical processor 12 to an address of a page 60*f* within physical memory, via SLAT configured by hypervisor 30.

In some embodiments, hypervisor 30 sets up its own virtual memory space 214*c* comprising a representation of physical memory 14, and employs a translation mechanism (for instance, page tables) to map addresses in space 214*c* to addresses in physical memory 14. In FIG. 5, such an exemplary mapping translates the address of a page 60*k* within virtual space 214*c* to the physical address of page 60*c*, and the address of a page 60*m* to the physical address of page 60*f*. Such mappings allow hypervisor 30 to manage (e.g., read from, write to, and control access to) memory pages belonging to software objects executing within various VMs running on host system 10.

Figure 6:
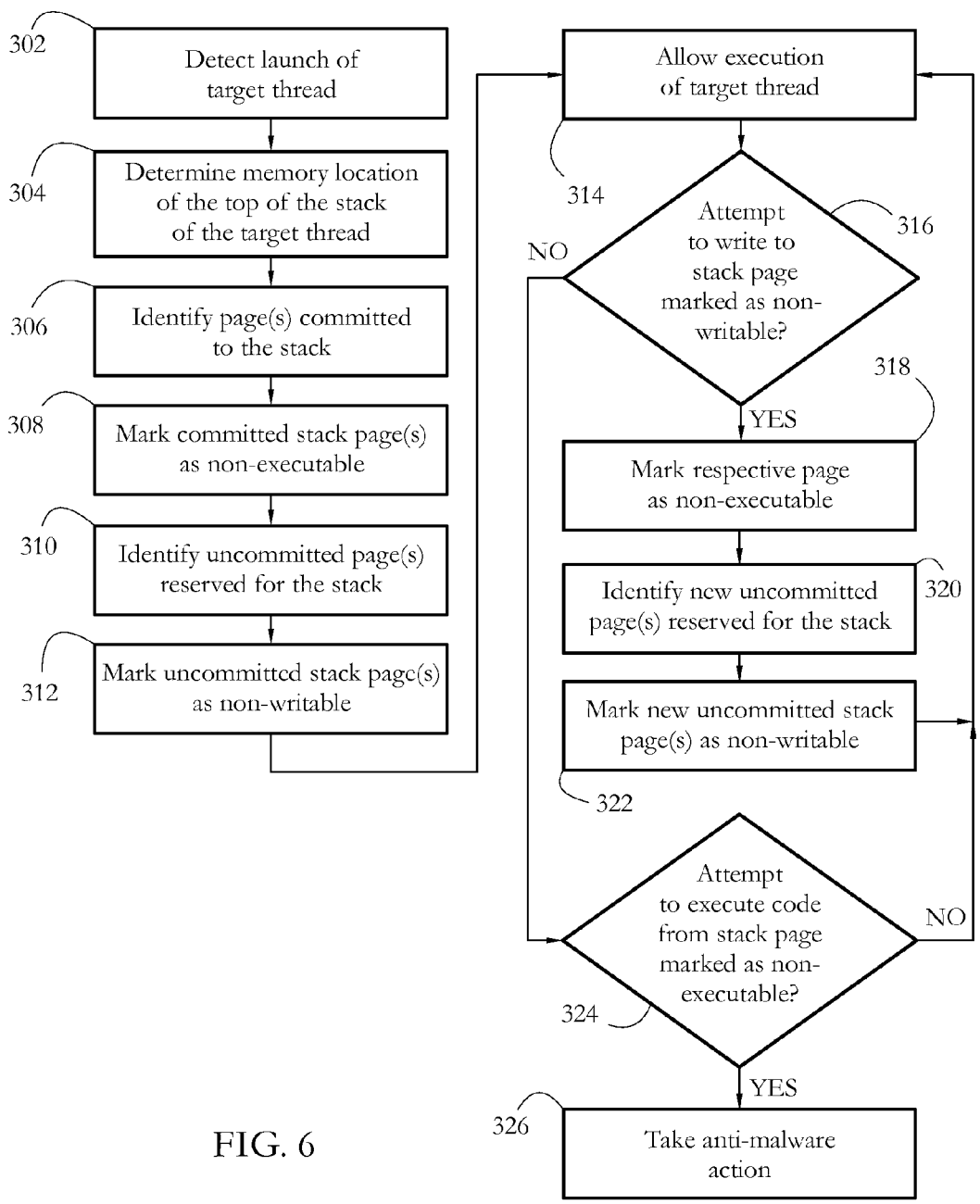
FIG. 6 shows an exemplary sequence of steps executed by the memory introspection engine to protect a virtual machine from malware according to some embodiments of the present invention.

FIG. 6 shows an exemplary sequence of steps performed by memory introspection engine 40 to protect a virtual machine from malware according to some embodiments of the present invention. Such anti-malware protection include, for instance, identifying a page of a memory space of a selected process executing within the respective VM, and preventing the execution of code located within the respective page. In some embodiments, the protected page is used by the call stack of a thread of the protected process.

To prevent a content of a memory page from being modified or executed, some embodiments employ features of the SLAT mechanism. Such features may be platform-specific. For instance, on Intel® platforms that support virtualization, the EPT entry of each physical memory page includes a set of access permission bits that indicate whether the respective page may be read from, written to, and executed, respectively. Such bits of the EPT may be set, for instance, by memory introspection engine 40 or by a component of hypervisor 30. In some embodiments, an attempt to perform an action which is forbidden according to current access permissions (e.g., attempting to write to a page marked as non-writable, or attempting to execute code from a page marked as non-executable) may trigger a VM exit event, such as VMExit on Intel® platforms. VM exits represent a particular type of processor event occurring during execution of software within a virtual machine. A VM exit typically suspends the execution of the current thread and transfers control of processor 12 to an event handler of hypervisor 30.

Such transfers allow software executing at the processor privilege level of hypervisor 30 to intercept an unauthorized write or execute attempt. In some embodiments, introspection engine 40 performs such interceptions as part of anti-malware operations, as shown below.

In a step 302, engine 40 detects the setup and/or launch of a thread (hereafter deemed target thread) within VM 32. The target thread may belong to any software object executing within VM 32, for instance to a process of guest OS 34 or to applications 42*e-f* (see FIG. 4). Thread and process management may be OS-specific. For instance, some versions of the Windows® OS manage processes using a list of active processes, maintained by the kernel. Each time a process is created, an indicator of the respective process is inserted into the list of active processes; the indicator is removed from the list upon termination of the respective process. Similarly, guest OS 34 maintains a list of active threads assigned to each process, and manages scheduling of such threads for execution.

To detect the launch of the target thread, some embodiments hook into a kernel function which manipulates the thread list, using any hooking method known in the art. An example of such function of the Windows OS is PspInsertThread, which adds a thread to the thread list of a process when the respective thread is ready for execution. One exemplary hooking method is to use a software object executing within VM 32 (e.g., driver 36 in FIG. 4) to apply a re-direction patch, such as a VMCALL instruction or a JMP instruction, to the respective kernel function. Other embodiments may modify the EPT entry of the respective kernel function, to point to a new address. The effect of such patches and/or EPT hooks is to redirect execution of the native OS function to a fragment of code provided by memory introspection engine 40. Following hooking, when OS 34 attempts to launch a thread into execution, the fragment of code will be executed before or instead of the code of the respective kernel function, thus notifying memory introspection engine 40 that a thread is being launched into execution. Yet another hooking method comprises modifying the EPT entry of a memory page holding the thread list, to mark the respective page as non-writable. A subsequent attempt to modify the thread list may thus be intercepted and analyzed by engine 40.

In a step 304 (FIG. 6), memory introspection engine 40 determines a location of the top of the stack of the target thread. The location may comprise a memory address within a virtual memory space of the process owning the target thread. Such determinations may be OS-specific, but in general, the memory location of the stack may be obtained by parsing a data structure used by the OS for process/thread management. For instance, in systems running Windows®, EPROCESS and ETHREAD structures are used to describe processes and threads, respectively. Such structures further reference other data structures, such as the process environment block (PEB) and thread environment block (TEB), which may store various memory addresses, including the virtual address of the stack, among others. Similar data structures exist in other operating systems, such as Linux®.

Figure 7:
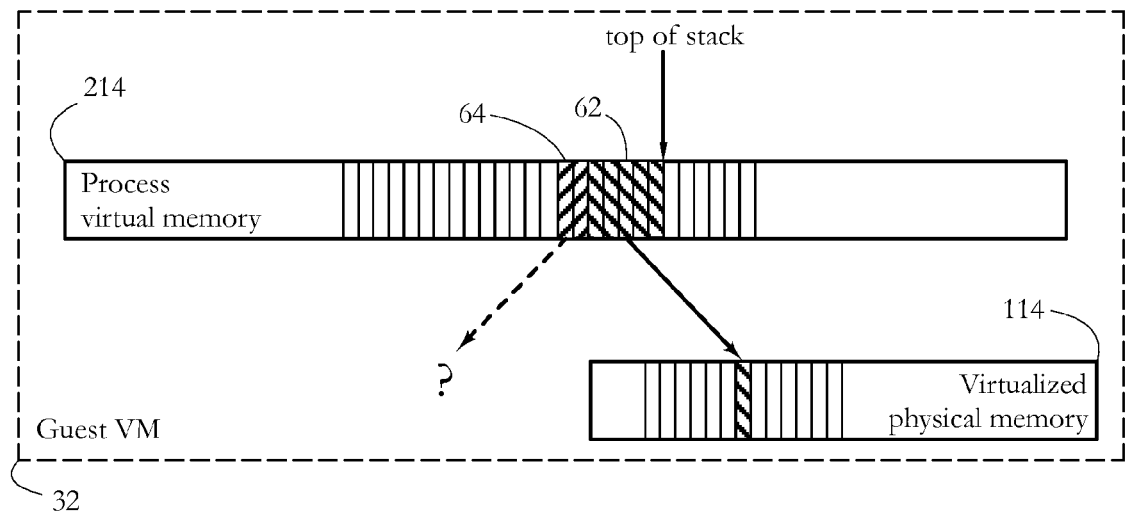
FIG. 7 shows an exemplary set of virtual memory pages reserved for a call stack of a thread targeted for malware protection according to some embodiments of the present invention.

Modern operating systems typically allocate virtual memory for the stack in a dynamic fashion. A set of memory pages may be reserved for the stack, only a small subset of which are actually committed to the stack, i.e., mapped by the OS to a physical memory of the host system. In systems running virtualization platforms, the operating system sees a virtualized physical memory (e.g., memory 114 in FIG. 3) as its physical memory, so committed virtual memory pages are actually mapped to the respective virtualized memory space, and further mapped to physical memory 14 via SLAT configured by hypervisor 30. FIG. 7 shows an exemplary set of memory pages reserved for a stack. A page 62 is committed to the stack, while a page 64 is reserved for the stack, but not yet committed. During execution of the respective thread, the stack may grow dynamically, e.g., some of the reserved pages are progressively committed to the stack, when needed.

Figure 8:
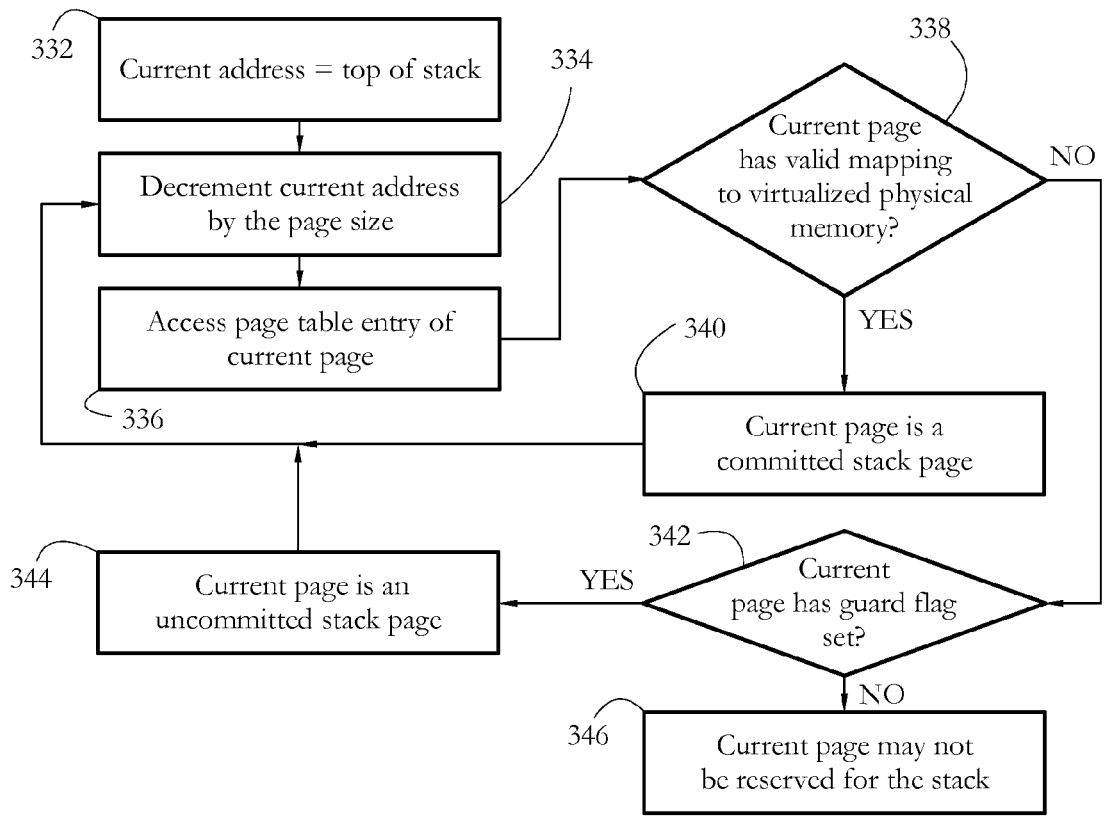
FIG. 8 shows an exemplary sequence of steps performed by the memory introspection engine to identify virtual memory pages committed and uncommitted to a call stack in a Windows® environment, according to some embodiments of the present invention.

Once the address of the top of the stack is known, steps 306 and 310 identify memory pages committed and not yet committed to the stack, respectively. FIG. 8 shows an exemplary sequence of steps performed by memory introspection engine 40 to identify such memory pages in a virtual machine running Windows OS. Starting from the top of the stack, the sequence walks the stack in the direction of decreasing addresses, analyzing each encountered page. A sequence of steps 336-338 accesses a page table entry for the current page, and determines according to the entry whether the page is a committed stack page, i.e., whether the page has a valid mapping to virtualized physical memory. When yes, the current page is identified as a committed stack page (step 340) and engine 40 further decrements the current address, thus selecting the next memory page for analysis. When the current page is not mapped to virtualized physical memory, a step 342 determines whether the current page is an uncommitted page reserved for the stack. In Windows, such pages are known as guard pages, and are correspondingly marked within the respective page table entry, e.g., with a special guard flag. When the guard flag is set for the respective page, in a step 344, engine 40 identifies the page as an uncommitted stack page. In some embodiments, following step 344, engine 40 may continue to walk the stack by returning to step 334, thus identifying all uncommitted stack pages. When the guard flag is not set for the current page, a step 346 may conclude that the current page may not be reserved for the stack, and exit.

Following the identification of committed and uncommitted stack pages, in a step 308, engine 40 may mark committed stack pages as non-executable using SLAT mechanisms outlined above. Such markings prevent execution of code from stack pages, effectively protecting the target thread from stack exploits. A step 312 may mark uncommitted stack pages as non-writable. In some embodiments, access violations such as an attempt to write to a non-writable page, or to execute code from a non-executable page, may trigger VM exit events, turning control of processor 12 to appropriate event handler routines executing at the privilege level of hypervisor 30. Such handler routines may be part of engine 40.

Engine 40 may now transfer execution to the target thread. When an attempt is made to write to a stack page marked as non-writable (step 312 above), in a step 316, engine 40 is notified via the event handler of the respective VM exit event. Such a write attempt typically indicates that the stack has grown to include the respective page, i.e. that guest OS 34 has committed the respective page to the stack, and is now trying to write stack data to it. A step 318 then marks the respective page as non-executable, to extend malware protection to the newly committed stack page. After committing a page to the stack, some operating systems mark the adjacent stack page as an uncommitted stack page (e.g., a guard page in Windows), to reserve it for future stack growth. In some embodiments, a sequence of steps 320-322 walks the stack to identify new uncommitted stack pages and to mark the respective pages as non-writable, as in step 312 above. Introspection engine 40 may then return execution to the target thread.

In response to an attempt to execute code from a stack page marked as non-executable, engine 40 may reclaim control of processor 12 from the target thread (step 324). Such an attempt may be indicative of a malicious stack exploit. In a step 326, engine 40 may take anti-malware action against the target thread. For instance, engine 40 may terminate the target thread and/or its owner process. Engine 40 may further display a malware alert to user of guest VM 32 and/or alert a system administrator. In some embodiments, introspection engine 40 may proceed to further analyze the stack, the target thread, and/or the process owning the target thread for evidence of malice. When no such evidence is found, some embodiments may return control of processor 12 to the target thread.

The exemplary systems and methods described above allow protecting a host system from malware using hardware virtualization technology. In some embodiments, a memory introspection engine operates at a processor privilege level of a hypervisor, i.e., below all virtual machines executing on a host system. The introspection engine may prevent a malicious exploitation of the call stack of a thread executing within a virtual machine, by preventing the execution of malicious code located within a memory page allocated to the stack.

In some embodiments, to prevent execution of code from certain memory pages, the introspection engine may employ second level address translation (SLAT) means of the host system, such as extended page tables (EPT) on Intel® platforms. The introspection engine may identify a physical memory page mapped to a virtual memory page used by the stack of the protected thread, and modify an EPT entry to mark the respective physical memory page as non-executable. A subsequent attempt to execute code from the respective stack page may generate a processor event that suspends the execution of the respective thread and transfers control of execution to the memory introspection engine, thus preventing the execution of code from the respective stack page.

In conventional anti-malware systems, security applications execute at a processor privilege level similar to that of the operating system and/or of common applications. Such systems may be vulnerable to advanced malware, which also operates at the privilege level of the operating system. In contrast, in some embodiments of the present invention, a hypervisor executes at the most privileged level (e.g., root mode or ring −1), displacing the operating system to a virtual machine. The memory introspection engine may execute at the same processor privilege level as the hypervisor. Anti-malware operations may thus be conducted from a position of higher processor privilege than that of the operating system. In some embodiments, a single memory introspection engine may protect multiple virtual machines executing concurrently on the respective computer system.

Although the memory introspection engine executes outside the protected virtual machine, the engine may determine virtual addresses used by software objects running within the protected VM. For instance, the introspection engine may identify virtual memory pages reserved for the stack of an executing thread. However, some operating systems allocate memory to the stack in a dynamic fashion. Not all pages reserved for the stack may actually be committed to the stack at all times, i.e., have a valid mapping to the virtualized physical memory space of the respective VM. Instead, the initial pool of uncommitted pages may be progressively committed to the stack, as needed, during execution of the respective thread. When the stack is allocated dynamically, it may be difficult for the introspection engine to know which pages to protect against execution. In some embodiments of the present invention, the introspection engine may identify a memory page which is reserved, but uncommitted to the stack, and may intercept an attempt to write to the respective page, for instance by using SLAT means as described above. An attempt to write to such a page may indicate that the OS has committed the respective page to the stack, and is trying to write stack data to it. In response to intercepting the write attempt, the memory introspection engine may mark the respective page as non-executable, thus extending protection to the newly committed stack page.

It will be clear to a skilled artisan that the above embodiments may be altered in many ways without departing from the scope of the invention. Accordingly, the scope of the invention should be determined by the following claims and their legal equivalents.

What is claimed is:

1. A method comprising employing at least one hardware processor of a host system to execute a memory introspection engine, the memory introspection engine executing outside of a virtual machine exposed by the host system, the virtual machine comprising a virtualized processor and a virtualized physical memory, the virtual machine configured to employ the virtualized processor to execute a target thread of a process, and wherein executing the memory introspection engine comprises:
identifying within a virtual memory space of the process a target page reserved for a call stack of the target thread, wherein identifying the target page comprises determining an address of a top of the call stack, and determining whether the target page is reserved for the call stack according to the address;
determining according to a page table of the virtual machine whether the target page is mapped to the virtualized physical memory; and
in response to determining whether the target page is mapped to the virtualized physical memory, when the target page is not mapped to the virtualized physical memory:
intercepting an attempt to write to the target page, and
in response to intercepting the attempt to write to the target page, changing an access permission of the target page to indicate that the target page is non-executable.

2. The method of claim 1, further comprising configuring the hardware processor to switch to executing the memory introspection engine in response to an attempt to execute a content of the target page.

3. The method of claim 1, wherein changing the access permission of the target page comprises:
identifying within a physical memory of the host system a physical page to which the target page is mapped; and
modifying a page table entry of the physical page to mark the physical page as non-executable.

4. The method of claim 3, wherein the page table entry of the physical page is an entry of a second level address translation (SLAT) page table.

5. The method of claim 1, wherein intercepting the attempt to write to the target page comprises configuring the hardware processor to switch, in response to the attempt to write to the target page, from executing the target thread to executing the memory introspection engine.

6. The method of claim 1, wherein executing the introspection engine further comprises, in preparation for intercepting the attempt to write to the target page:
identifying within a physical memory of the host system a physical page to which the target page is mapped; and
modifying a page table entry of the physical page to mark the physical page as non-writable.

7. The method of claim 6, wherein the page table entry of the physical page is an entry of a second level address translation (SLAT) page table.

8. The method of claim 6, wherein executing the introspection engine further comprises, in response to intercepting the attempt to write to the target page, modifying the page table entry of the physical page to mark the physical page as writable.

9. The method of claim 1, wherein determining whether the target page is mapped to the virtualized physical memory comprises:
determining according to the page table of the virtual machine whether the target page is a guard page; and
in response, when the target page is a guard page, concluding that the target page is not mapped to the virtualized physical memory.

10. The method of claim 1, wherein executing the memory introspection engine further comprises, in response to changing the access permission of the target page:
identifying within the virtual memory space of the process a second page reserved for the call stack of the target thread;
determining according to the page table of the virtual machine whether the second page is mapped to the virtualized physical memory; and
in response, when the second page is not mapped to the virtualized physical memory, intercepting an attempt to write to the second page, and
in response to intercepting the attempt to write to the second page, changing an access permission of the second page, to indicate that the second page is non-executable.

11. The method of claim 1, wherein executing the memory introspection engine further comprises, in response to changing the access permission of the target page:
intercepting an attempt to execute a content of the target page; and in response, determining whether the attempt to execute the content is indicative of malware.

12. A host system comprising a hardware processor configured to operate:
a virtual machine comprising a virtualized processor and a virtualized physical memory, the virtual machine configured to employ the virtualized processor to execute a target thread of a process; and
a memory introspection engine executing outside the virtual machine and configured to:
identify within a virtual memory space of the process a target page reserved for a call stack of the target thread, wherein identifying the target page comprises determining an address of a top of the call stack, and determining whether the target page is reserved for the call stack according to the address;
determine according to a page table of the virtual machine whether the target page is mapped to the virtualized physical memory; and
in response to determining whether the target page is mapped to the virtualized physical memory, when the target page is not mapped to the virtualized physical memory:
intercept an attempt to write to the target page, and
in response to intercepting the attempt to write to the target page, change an access permission of the target page to indicate that the target page is non-executable.

13. The host system of claim 12, wherein the memory introspection engine further configures the hardware processor to switch to executing the memory introspection engine in response to an attempt to execute a content of the target page.

14. The host system of claim 12, wherein changing the access permission of the target page comprises:
identifying within a physical memory of the host system a physical page to which the target page is mapped; and
modifying a page table entry of the physical page to mark the physical page as non-executable.

15. The host system of claim 14, wherein the page table entry of the physical page is an entry of a second level address translation (SLAT) page table.

16. The host system of claim 12, wherein intercepting the attempt to write to the target page comprises configuring the hardware processor to switch, in response to the attempt to write to the target page, from executing the target thread to executing the memory introspection engine.

17. The host system of claim 12, wherein the introspection engine is further configured, in preparation for intercepting the attempt to write to the target page, to:
identify within a physical memory of the host system a physical page to which the target page is mapped; and
modify a page table entry of the physical page to mark the physical page as non-writable.

18. The host system of claim 17, wherein the page table entry of the physical page is an entry of a second level address translation (SLAT) page table.

19. The host system of claim 17, wherein the introspection engine is further configured, in response to intercepting the attempt to write to the target page, to modify the page table entry of the physical page to mark the physical page as writable.

20. The host system of claim 12, wherein determining whether the target page is mapped to the virtualized memory comprises:
determining according to the page table of the virtual machine whether the target page is a guard page; and
in response, when the target page is a guard page, concluding that the target page is not mapped to the virtualized physical memory.

21. The host system of claim 12, wherein the memory introspection engine is further configured, in response to changing the access permission of the target page, to:
identify within the virtual memory space of the process a second page reserved for the call stack of the target thread;
determine according to the page table of the virtual machine whether the second page is mapped to the virtualized physical memory; and
in response, when the second page is not mapped to the virtualized physical memory, intercept an attempt to write to the second page, and
in response to intercepting the attempt to write to the second page, change an access permission of the second page to indicate that the second page is non-executable.

22. The host system of claim 12, wherein the memory introspection engine is further configured, in response to changing the access permission of the target page, to:
intercept an attempt to execute a content of the target page; and
in response, determine whether the attempt to execute the content is indicative of malware.

23. A non-transitory computer-readable medium storing instructions which, when executed by at least one hardware processor of a host system, cause the host system to form a memory introspection engine executing outside of a virtual machine exposed by the host system, the virtual machine comprising a virtualized processor and a virtualized physical memory, the virtual machine configured to employ the virtualized processor to execute a target thread of a process, and wherein the memory introspection engine is configured to:
identify within a virtual memory space of the process a target page reserved for a call stack of the target thread, wherein identifying the target page comprises determining an address of a top of the call stack, and determining whether the target page is reserved for the call stack according to the address;
determine according to a page table of the virtual machine whether the target page is mapped to the virtualized physical memory; and
in response to determining whether the target page is mapped to the virtualized physical memory, when the target page is not mapped to the virtualized physical memory:
intercept an attempt to write to the target page, and
in response to intercepting the attempt to write to the target page, change an access permission of the target page, to indicate that the target page is non-executable.

* * * * *